Dec. 14, 1937.  G. W. KEMP  2,102,078
SUPPORT DEVICE
Filed Feb. 9, 1935  2 Sheets-Sheet 1

INVENTOR.
George W. Kemp
BY
HIS ATTORNEY.

Dec. 14, 1937.　　　　G. W. KEMP　　　　2,102,078
SUPPORT DEVICE
Filed Feb. 9, 1935　　　　2 Sheets-Sheet 2

INVENTOR
George W. Kemp
BY
*S. Thrall Brewer*
HIS ATTORNEY

Patented Dec. 14, 1937

2,102,078

UNITED STATES PATENT OFFICE 2,102,078

SUPPORT DEVICE

George W. Kemp, Dayton, Ohio

Application February 9, 1935, Serial No. 5,759

6 Claims. (Cl. 248—210)

This invention relates to a support device or holder, and more particularly to a portable support device or holder for holding a container, vessel, or other article in a desired position.

Devices of this type are of very considerable utility to painters, decorators, carpenters, fruit pickers, window washers and others who desire or need a container such as a bucket held in some position handy to their work. There may also be a considerable number of other uses for the device, but those indicated above are believed to be the principal or exemplary uses, and certainly indicate utility that shows the value of such a device.

Quite a number of devices have been patented for holding a bucket or similar container, but all of these devices leave much to be desired. For instance, they are all considerably limited with respect to the structure or object to which the device can be fastened or connected, or upon which the device can be mounted. Also, they are limited with respect to the position in which the device can be connected or mounted relative to the structure or object to which the device is connected, or upon which it is mounted. Furthermore, they are limited with respect to the position in which the supported article or container can be held relative to the structure or object to which the device is connected, or upon which it is mounted.

It is to overcome these deficiencies in the prior devices, and to provide a structure that is improved in other ways over the prior devices that the present invention has been developed.

It is therefore an object of the present invention to provide a support device that can be securely mounted in a plurality of positions relative to the structure or object to which it is connected, or upon which it is mounted.

It is also an object of this invention to provide a support device that can be secured to or mounted upon a plurality of different kinds or types of structures or objects.

Another object of the present invention is to provide a support device which, when mounted in a given position relative to a structure or object, permits the supported article to be held in a plurality of positions relative to the structure or object.

Another object of this invention is to provide a support device that holds the supported article firmly in position.

From the description which follows, it will become apparent that these objects are accomplished by a structure incorporating a multi-part bracket, a first part of which comprehends a pair of substantially parallel members each having hook portions at one end thereof, means substantially rigidly connecting said members together, an arm pivotally connected to one of the members, a hook and resilient means connecting the hook to said first part, and a second part of which bracket is adapted to receive a container and comprehends a base and container holding means; and means pivotally connecting said parts together, the construction and arrangement being such as to provide for adjustment of the second part in directions parallel to and in a plane transverse to the said first part.

Further objects and advantages of the present invention will be apparent from the following description, reference being had to the accompanying drawings, wherein a preferred embodiment of the present invention is clearly illustrated and described.

Figure 1:
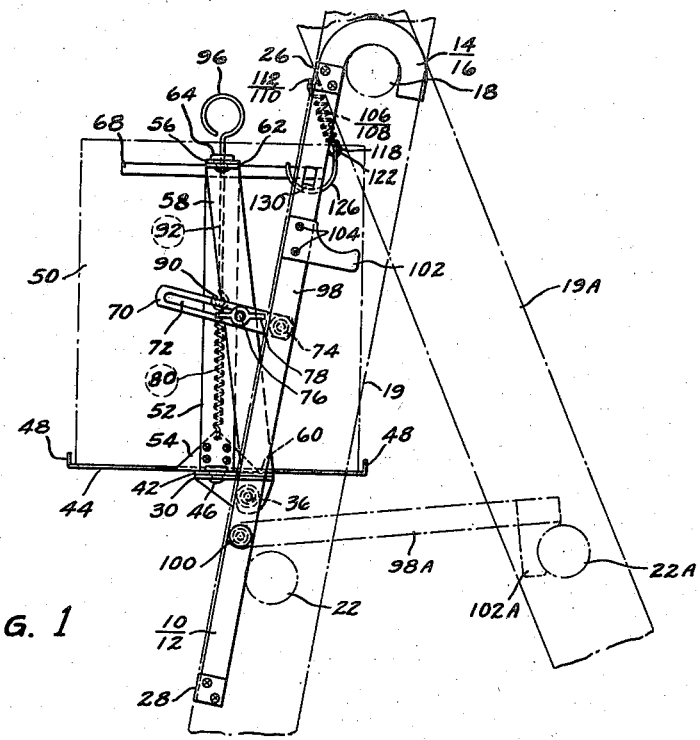
Fig. 1 is a side elevation of a preferred embodiment of the present invention, and indicates the manner in which the device is mounted in a plurality of positions with respect to a conventional type of ladder, the ladder being indicated in dot and dash lines.
Figure 2:
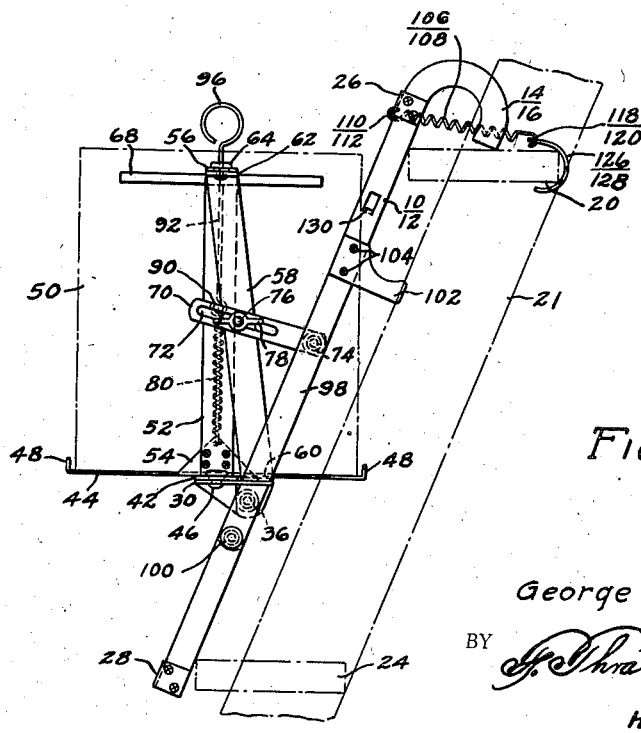
Fig. 2 is also a side elevation of a preferred form of the present invention, and indicates the manner in which the device is mounted on a structure, such as a step-ladder, having wider members to which the device is connected, the step-ladder being indicated in dot and dash lines.
Figure 3:
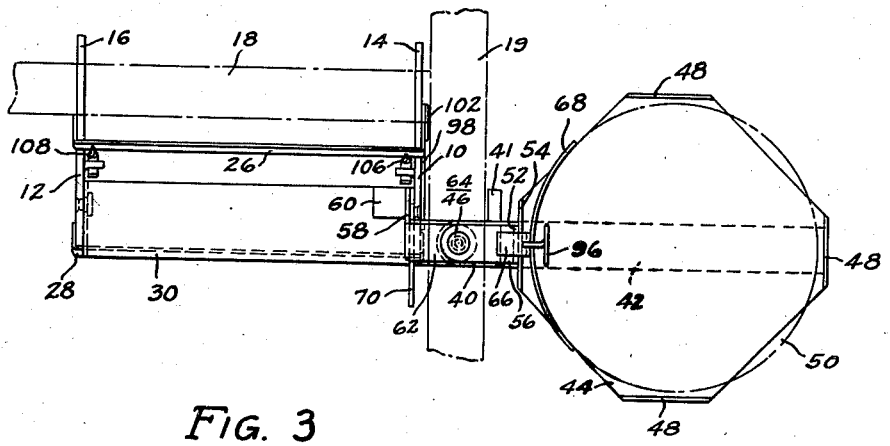
Figs. 3 and 4 are top and front elevations respectively of a preferred form of the present invention, and indicate the manner in which the device is mounted on a conventional type of ladder, as well as one possible position of the supported device with respect to the ladder, the ladder and the supported device being indicated in dot and dash lines.
Figure 4:
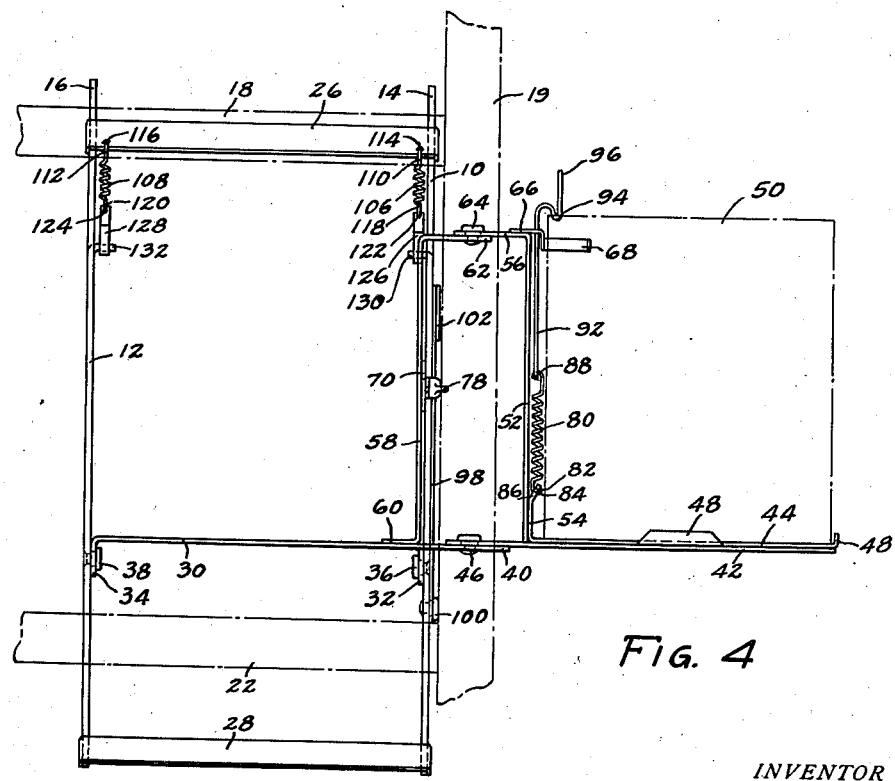

With particular reference to the drawings, main support members 10 and 12 have hook portions 14 and 16 respectively, which hook portions are adapted to fit over a rung 18 of a ladder 19, as indicated in Figs. 1, 3, and 4. When the device is mounted as shown in Fig. 2, the ends of the hook portions rest against the surface of a step 20, which is indicated as that of a step-ladder 21, or other similar surface. The main support members 10 and 12 are preferably strips of metal, such as iron or steel, and the hook portions 14 and 16 are preferably integral with the main support members 10 and 12 respectively, and at the ends thereof. The other ends of the main support members 10 and 12 rest against a rung 22 of the ladder when the ladder is in one position, as indicated in Figs. 1, 3, and 4, and against a step 24, as indicated in Fig. 2. The main support members 10 and 12 are held apart by spacing members 26 and 28, which spacing members are preferably metal strips having their ends bent to provide angle joints, and are preferably secured to the main support members 10 and 12 by spot welding.

A cross member 30 also extends across the device between the main support members 10 and 12, and has angle portions 32 and 34 that are preferably integral therewith, and are preferably pivotally secured to the members 10 and 12 by rivets 36 and 38 respectively, or other suitable fastening means. A portion 40 of the cross member 30 extends beyond the support member 10, and has a projecting portion 41 thereon, which projecting portion preferably projects along the outside or outer surface of the ladder when the device is mounted as shown in Figs. 3 and 4. This cross member 30 provides a support for a pivotally mounted arm 42 to which a base plate 44 is secured by spot welding, or other suitable means. The arm 42 is pivotally connected to the projecting portion 40 of the cross member 30 by a rivet 46, or other suitable means. The base plate 44 has a plurality of angularly projecting lugs such as 48 on the edges thereof for preventing the bottom of a bucket 50 or other supported device from slipping off of the base plate, and to aid in securely holding the bucket or other device. An upright member 52 is secured to an angularly projecting portion 54 of the base plate 44, and has an angularly projecting portion 56 that is preferably integral therewith. A second upright member 58, that is preferably angularly disposed with respect to the upright member 52, has an angular end portion 60 that is secured to the cross member 30 by spot welding or other suitable means, and an angularly projecting end portion 62 adjacent the projecting portion 56 of the member 52. The projecting portions 56 and 62 are pivotally connected by a rivet 64, or other suitable means. The rivets 46 and 64 are preferably in axial alignment so that they provide a pivotal mounting for the member 52, and the member 52 and base plate 44, as well as the arm 42 can be swung around the pivotal axis thus provided. A bracket 66 is secured to the projecting portion 56 of the member 52 by spot welding, or other suitable means, and has a preferably arcuate member 68 secured thereto by spot welding or other suitable means, which arcuate member serves to locate the top of the bucket or supported device 50.

A link 70 having an elongated slot 72 therein is pivotally secured to the main support member 10 by a rivet 74 or other suitable means, above the rivet 36, as viewed in the drawings. A stud 76 is secured to the upright member 58, and extends thru the slot 72. This stud 76 is preferably provided with a wing-nut 78, which wing-nut can be loosened to permit angular adjustment of the bucket or supported device and upright member 58 relative to the main support members, and tightened to maintain that angular adjustment. A spring 80 preferably has a hook portion 82 that is hooked into an aperture 84 in an angularly disposed portion 86 of the angular portion 54, so as to anchor that end of the spring. The other end of the spring 80 preferably has a hook portion 88 that is hooked into an eyelet 90 that is formed on the end of a clamping member 92. This clamping member 92 extends thru an opening in the bracket 66, and has a hook or catch portion 94 and a handle 96 formed on the other end thereof. The spring 80 is normally under tension, so that when stretched by exerting a force upon the handle 96, the edge of bucket or container 50 will be gripped by the hook or clamp portion when said bucket or container is in position and the parts assume the position best indicated in Figs. 3 and 4.

A brace or arm 98 is pivotally mounted at one end to the main support member 10 by a rivet or other suitable means 100, and has an angularly disposed notched member 102 secured to its other end by spot welding, as at 104, or by other suitable means. When the device is mounted as shown in Fig. 2, the brace 98 is normally disposed adjacent the main support member 10. However, when the device is mounted on the other side of a ladder, as indicated in Fig. 1 by the parts designated by reference numerals having an "A" affixed thereto, the brace is disposed angularly with respect to the main support member 10, and supports that member at a distance from the ladder.

Springs 106 and 108 each preferably have hook portions 110 and 112 respectively, which hook portions are hooked in apertures 114 and 116 respectively that are near the ends of the member 26. The other ends of the springs 106 and 108 preferably have hook portions 118 and 120 respectively, which hook portions are hooked in apertures 122 and 124 in hook members 126 and 128 respectively. The hooks 126 and 128 are preferably normally hooked over lugs 130 and 132 respectively when the device is mounted as shown in Figs. 1, 3, and 4. These lugs are preferably extruded from the main support members 10 and 12 respectively. When the device is mounted on a step-ladder, or some such object or structure having a surface or member such as the step 20, indicated in Fig. 2, which is too wide for the hook portions 14 and 16 to hook over, the device is mounted so that the ends of the hook portions engage the step or structure, and the hooks 126 and 128 are hooked over the edge of the step or structure to hold the device in position.

In using this support device, it is quite apparent from the drawings, and from the above description, that the device can be mounted in a plurality of positions with respect to the structure or object, such as a ladder, upon which it is mounted. As indicated in Fig. 1, the device can be mounted on either side of the ladder by hooking the hook portions 14 and 16 over a rung of a ladder on the desired side thereof, and either letting the main support members 10 and 12 rest against another rung of the ladder, or supporting the lower end of the device away from the ladder by utilizing the brace member 98 in a position such as 98a, so that the notched member 102 engages a rung of the ladder, such as 22a. The device can also be mounted upon a step-ladder or other structure as indicated in Fig. 2 by utilizing the hooks 126 and 128 that are connected to the main support members 10 and 12 by tension springs 106 and 108 respectively. When, however, the hooks 126 and 128 are not in use, they are kept out of the way by being hooked over the lugs 130 and 132 respectively. The bucket or supported device can be kept erect regardless of the slope of the ladder or structure, within reasonable limits, by the adjustment of the position thereof with respect to the main support members 10 and 12. This is accomplished by loosening the wing-nut 78 so that the base plate 44 and upright members 52 and 58 pivot about the pivotal axis therefor which is provided by the rivets 36 and 38. When the wing-nut is tightened so that it clamps the link 70, the position of the bucket or supported device is determined and maintained.

It is also quite apparent from Figs. 3 and 4 that a variety of positions of the bucket or supported device are obtainable by swinging the bucket or supported device about the pivotal axis provided by the rivets 46 and 64. The extreme positions of movement are indicated in Figs. 3 and 4. In all of these positions of the support device and the bucket or supported device, it is also a feature of the present structure that the bucket or supported device is firmly clamped in place, and being thus clamped, cannot swing or readily shift positions. Furthermore, since the bottom of the bucket is kept from slipping by the projecting portions 48 of the base plate, and the top is located by the member 68 and clamped in position by the clamping member 92, the bucket or supported device cannot fall off of the support device or be tipped so as to spill the contents thereof.

From the foregoing description it is apparent that in one aspect the invention comprises chiefly a multi-part bracket, one part of which comprehends a pair of members 10 and 12 adapted to engage a supporting structure 19 or 21 and another part of which includes a base 44 adapted to support a container 50, and means 36, 38, and 46 pivotally connecting the parts together, construction and arrangement being such as to provide for adjustment of the container receiving base 44 in directions parallel to and in a plane transverse to said support engaging part.

Some of the advantages of the structure herein disclosed are as follows:

(1) The support device itself can be securely mounted in a plurality of positions relative to the ladder or object to which it is connected or mounted.

(2) The support device permits the bucket or supported object to be held in a plurality of positions relative to the ladder or supporting structure by construction and arrangement adapted for adjustment in two transverse planes.

(3) The support device is adapted to be securely held in position and mounted on different kinds of supporting structures.

(4) The supported container is securely held in position.

While the form of embodiment of the present invention as herein disclosed constitutes a preferred form, it is to be understood that other forms might be adopted, all coming within the scope of the claims which follow.

What is claimed is as follows:

1. A device of the character described for holding a container relative to a supporting structure, comprising, in combination, a multi-part bracket, one part of which is adapted to engage a supporting structure and another part to receive a container, and means pivotally connecting the parts together, the construction and arrangement being such as to provide for adjustment of the container receiving part in directions parallel to and in a plane transverse to said support engaging part.

2. A device of the character described for holding a container relative to a supporting structure, comprising, in combination, a multi-part bracket, one part of which comprehends a pair of members adapted to engage a supporting structure and another part of which includes a base adapted to support a container and means adapted to hold the container in position on the base; and means pivotally connecting the parts together, said last mentioned means comprehending a member pivotally secured to each of said parts and so constructed and arranged that the container receiving part is adjustable in directions parallel and transverse to one of said members.

3. A device of the character described for holding a container relative to a ladder having rungs, comprising, in combination, a multi-part bracket, a first part of which comprehends members having portions adapted to engage a step of a ladder, a portion adapted to engage another portion of the ladder and means adapted to hold said members in engagement with the ladder, and a second part of which bracket is adapted to directly support a container; and means pivotally connecting the second part to one of said members of the first part, the construction and arrangement being such as to provide for adjustment of the second part to level the container at different ladder slopes and so as to provide for movement of the second part to different positions in a plane transverse to the ladder.

4. A device of the character described for supporting a container relative to a ladder having rungs comprising, in combination, a multi-part bracket, a first part of which comprehends a pair of substantially parallel members each having hook portions at one end thereof adapted to engage a rung of a ladder, means substantially rigidly connecting said members together, and an arm pivotally connected to one of the members and adapted to engage another rung of the ladder, and a second part of which bracket is adapted to receive a container and comprehends a base and container holding means; and means pivotally connecting said parts together, the construction and arrangement being such as to provide for adjustment of the said second part in directions parallel to and in a plane transverse to the said first part.

5. A device of the character described adapted to support a container relative to a ladder having steps comprising, in combination, a multi-part bracket, one part of which bracket is adapted to engage a step of a ladder, a hook and resilient means connecting the hook to the said one part, said hook being adapted to grip the ladder to hold the said one part in engagement with the said step, another part of said bracket being adapted to receive a container; and means pivotally connecting said parts together, the construction and arrangement being such as to provide for adjustment of the container receiving part in two directions that are transverse to each other.

6. A device of the character described adapted to support a container relative to a supporting structure comprising, in combination, a multi-part bracket, one part of which is adapted to engage a supporting structure and another part of which is adapted to receive a container, the container receiving part including resiliently urged hook means adapted to grip the container and hold it in place; and means pivotally connecting said parts together, the construction and arrangement being such as to provide for adjustment of the container receiving part in directions parallel to and in a plane transverse to the support engaging part.

GEORGE W. KEMP.